US007628082B2

(12) United States Patent
Sparks et al.

(10) Patent No.: US 7,628,082 B2
(45) Date of Patent: Dec. 8, 2009

(54) MICROFLUIDIC DEVICE AND MICROTUBE THEREFOR

(75) Inventors: Douglas Ray Sparks, Whitmore Lake, MI (US); Diane Riley, Flat Rock, MI (US); Nader Najafi, Ann Arbor, MI (US)

(73) Assignee: Integrated Sensing Systems, Inc., Ypsilanti, MI (US)

( * ) Notice: Subject to any disclaimer, the term of this patent is extended or adjusted under 35 U.S.C. 154(b) by 0 days.

(21) Appl. No.: 12/143,942

(22) Filed: Jun. 23, 2008

(65) Prior Publication Data
US 2008/0314161 A1 Dec. 25, 2008

Related U.S. Application Data

(60) Provisional application No. 60/936,993, filed on Jun. 25, 2007, provisional application No. 60/936,997, filed on Jun. 25, 2007.

(51) Int. Cl.
*G01F 1/84* (2006.01)
(52) U.S. Cl. ................................. 73/861.354
(58) Field of Classification Search ............... None
See application file for complete search history.

(56) References Cited

U.S. PATENT DOCUMENTS

| | | | | |
|---|---|---|---|---|
| 7,238,324 | B2 * | 7/2007 | Ko et al. ..................... 422/100 |
| 7,351,603 | B2 * | 4/2008 | Sparks et al. ................. 438/50 |
| 7,381,628 | B2 * | 6/2008 | Sparks et al. ............... 438/456 |
| 2003/0061889 | A1 | 4/2003 | Tadigadapa et al. |
| 2007/0151335 | A1 * | 7/2007 | Sparks et al. ............ 73/204.26 |

* cited by examiner

*Primary Examiner*—Harshad Patel
(74) *Attorney, Agent, or Firm*—Hartman & Hartman, P.C.; Gary M. Hartman; Domenica N.S. Hartman

(57) ABSTRACT

A microfluidic device for assessing properties of a fluid. The device utilizes a microtube capable of different vibration modes for promoting certain performance and/or structural aspects of the device. The microtube is supported by a base so as to be spaced apart from a substrate surface. The microtube has a peripheral portion surrounding the base, arms supporting the peripheral portion from the base, and a continuous internal microchannel having at least first and second microchannel portions. Each microchannel portion defines a separate flow route, and each flow route originates at the base, continues through a portion of the peripheral portion, and returns to the base. The first and second microchannel portions are fluidically connected to inlet and outlet ports, respectively, within the base. Vibration of the microtube is induced and sensed by driving and sensing elements. Fluid properties are determined from outputs of the sensing elements.

28 Claims, 7 Drawing Sheets

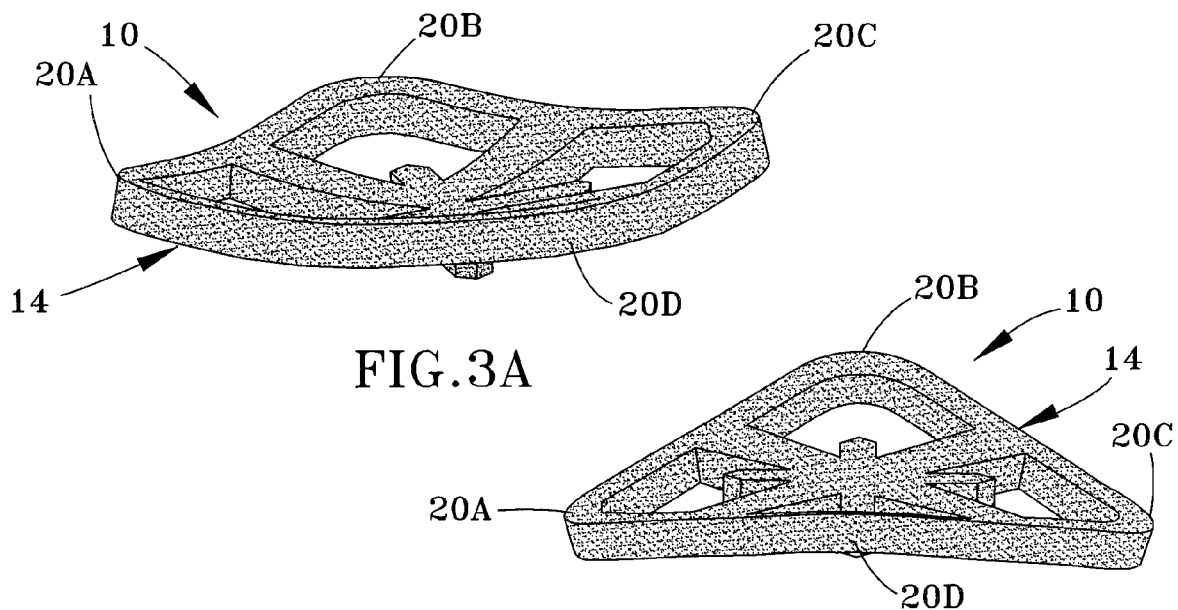
FIG.3A
FIG.3B
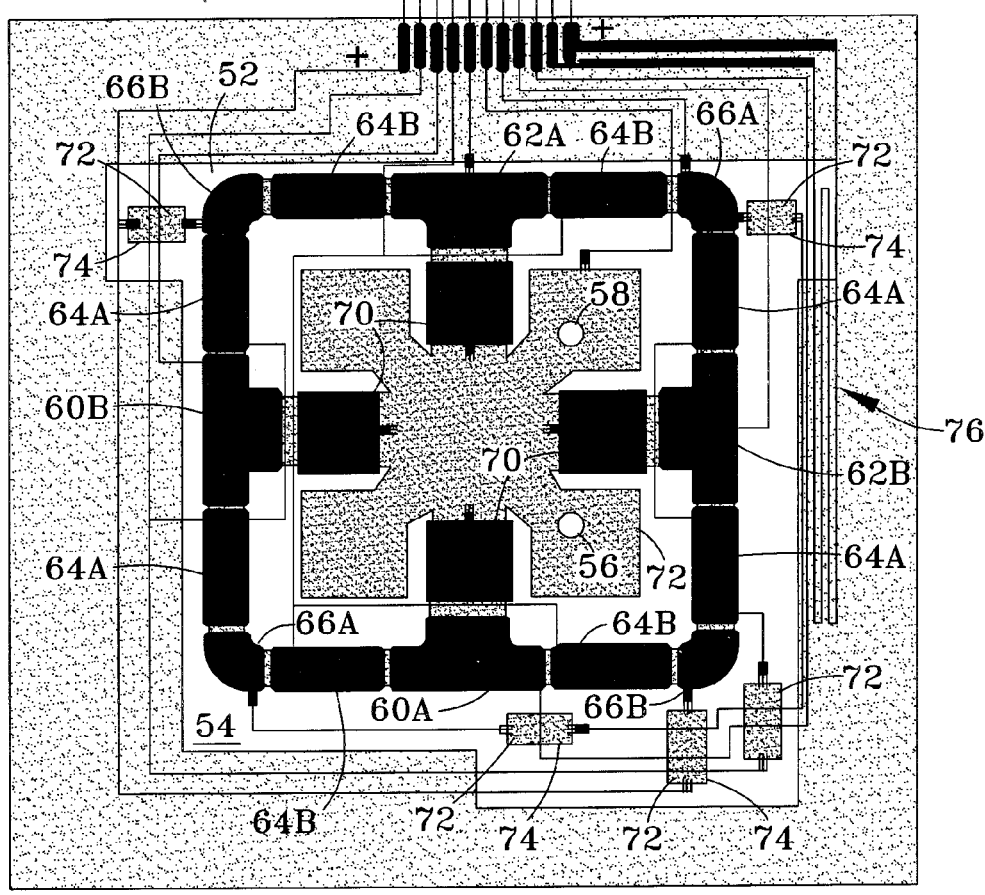
FIG.4

MICROFLUIDIC DEVICE AND MICROTUBE THEREFOR

CROSS REFERENCE TO RELATED APPLICATIONS

This application claims the benefit of U.S. Provisional Application No. 60/936,993 filed Jun. 25, 2007, and U.S. Provisional Application No. 60/936,997 filed Jun. 25, 2007, the contents of which are incorporated herein by reference.

BACKGROUND OF THE INVENTION

The present invention generally relates to devices and methods for measuring properties of fluids. More particularly, this invention relates to a microfluidic device equipped with a microchannel through which a fluid flows and means for ascertaining properties of the fluid while flowing through the microchannel.

Microfluidic devices have been adapted to sense properties of fluids in a variety of applications. Examples of microfluidic devices include Coriolis mass flow sensors, density sensors, fuel cell concentration meters, chemical concentration sensors, specific gravity sensors, temperature sensors, drug infusion devices and other devices that can employ microtubes, including resonating tubes and stationary tubes. Fluid delivery devices, systems, and methods capable of making use of microfluidic devices have become of particular interest, including drug infusion systems and fuel cell systems, both of which require devices capable of accurately delivering and monitoring the properties of small amounts of fluids.

An example of an electromechanical microfluidic device capable of meeting the above-noted requirements include a Coriolis-based fluid sensing device preferably of a type disclosed in commonly-assigned U.S. Pat. No. 6,477,901 to Tadigadapa et al., whose contents relating to the fabrication and operation of a Coriolis-based sensor are incorporated herein by reference. Various advancements of this technology are continuously pursued, as exemplified in commonly-assigned U.S. Patent Application Publication Nos. 2007/0151335 and 2007/0157739 to Sparks et al., whose contents relating to the fabrication and operation of Coriolis-based sensors are also incorporated herein by reference. With such devices, flow rates and fluid densities can be accurately measured to monitor fluid delivery, chemical concentrations, and various other properties of a fluid flowing through a microchannel within a resonating tube. The tube is suspended over a substrate and typically U-shaped, omega-shaped, or D-shaped. One or more drive electrodes located on the substrate beneath the tube are, for example, capacitively coupled to the tube for capacitively (electrostatically) driving the tube at or near resonance, while sensing electrodes sense (e.g., capacitively, optically, etc.) the deflection of the tube relative to the substrate and provide feedback to enable the vibration frequency induced by the drive electrode to be controlled with appropriate circuitry. With a fluid flowing through its microchannel, the tube can be vibrated at or near resonance by the drive electrode to ascertain certain properties of the fluid, such as flow rate and density, using Coriolis force principles. In particular, as the tube is driven at or near resonance by the drive electrode, the sensing electrodes sense a twisting motion of the tube, referred to as the Coriolis effect. The degree to which the tube deflects during a vibration cycle as a result of the Coriolis effect can be correlated to the mass flow rate of the fluid flowing through the tube, while the density of the fluid is proportional to the frequency of vibration at resonance. Notable advantages of such devices include the extremely miniaturized scale to which they can be fabricated and their ability to precisely analyze very small quantities of fluids. These devices can be vacuum packaged to further improve their performance by reducing air damping effects.

While sensors of the type taught by Tadigadapa et al. and Sparks et al. have proven to be extremely precise in their ability to measure properties of fluids, further improvements capable of addressing the above-noted issues would be desirable.

BRIEF SUMMARY OF THE INVENTION

The present invention provides a microfluidic device suitable for assessing one or more properties of a fluid. The microfluidic device utilizes a microtube configured to be capable of multiple different vibration modes, each capable of promoting certain desirable performance or structural aspects of the device.

According to a preferred aspect of the invention, a microfluidic device includes a structure comprising a base supported by a substrate and a microtube supported by the base so as to be spaced apart from a surface of the substrate and capable of vibrating in a plane normal to the surface of the substrate. The microtube has a peripheral portion surrounding the base, arms supporting the peripheral portion from the base, and at least one continuous internal microchannel having at least first and second microchannel portions. Each of the first and second microchannel portions defines a separate flow route, and each flow route originates at the base, continues through a portion of the peripheral portion of the microtube, and returns to the base. The first microchannel portion is fluidically connected to an inlet port within the base and the second microchannel portion is fluidically connected to an outlet port within the base. At least one driving element is present for vibrating the microtube, and at least one sensing element is present for sensing deflections of the peripheral portion of the microtube when vibrated with the driving element, and is adapted for producing outputs corresponding to the sensed deflections. The microfluidic device determines the property of the fluid from the outputs of the sensing element.

The microtube of the microfluidic device can be configured to have multiple portions of the microchannel that are in fluidic series or in fluidic parallel. Furthermore, the multiple microchannel portions can be defined within loops of the microtube that are disposed symmetrically about the base. In this manner, the base is effectively surrounded by the microtube, enabling vibration modes in which the microtube loops or portions thereof may vibrate in-phase or out-of-phase with each other. Desirable performance and/or structural aspects of the microfluidic device can be promoted by appropriately selecting one of the vibrational mode.

Other objects and advantages of this invention will be better appreciated from the following detailed description.

BRIEF DESCRIPTION OF THE DRAWINGS

FIGS. 2A, 2B, 3A, and 3B depict three different vibrational operating modes for the microfluidic device of FIG. 1.

FIG. 4 is a plan view of a substrate configured for mounting the microtube of FIG. 1, and whose surface is equipped with drive, sense, and balance electrodes for causing, sensing, and controlling movement of the microtube.

DETAILED DESCRIPTION OF THE INVENTION

Figure 1:
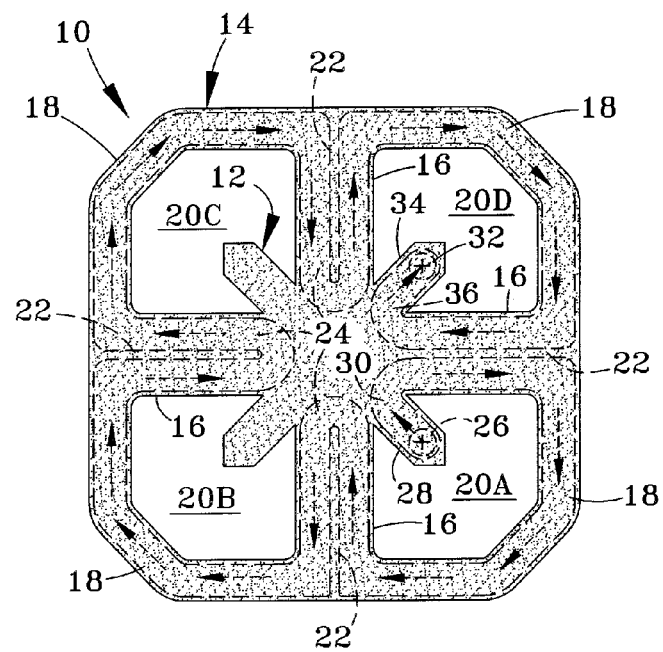
FIG. 1 is a plan view of a resonating microtube for a microfluidic device in accordance with a first embodiment of this invention.
Figure 5:
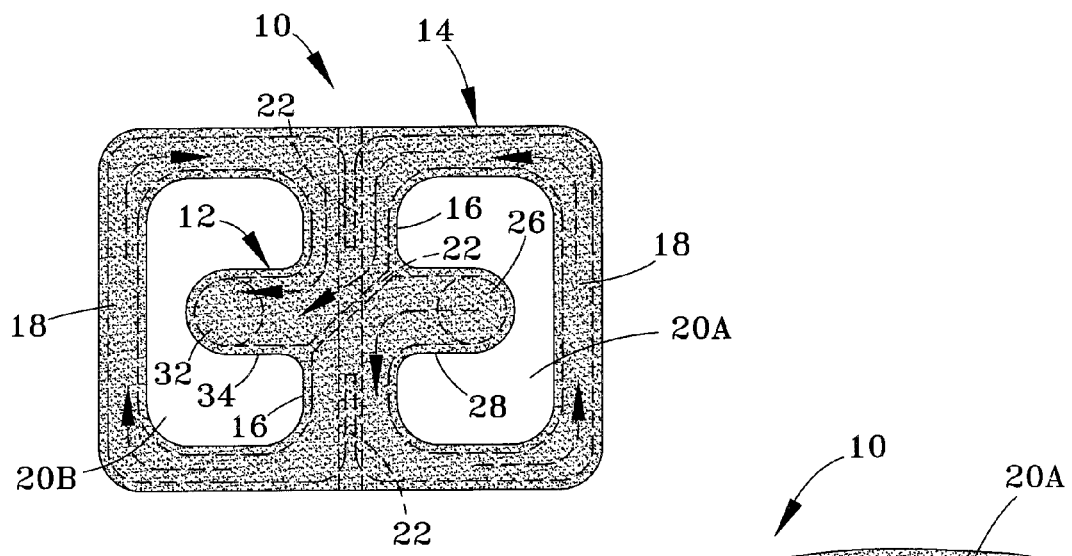
FIG. 5 is a plan view of a resonating microtube for a microfluidic device in accordance with a second embodiment of this invention.
Figure 7:
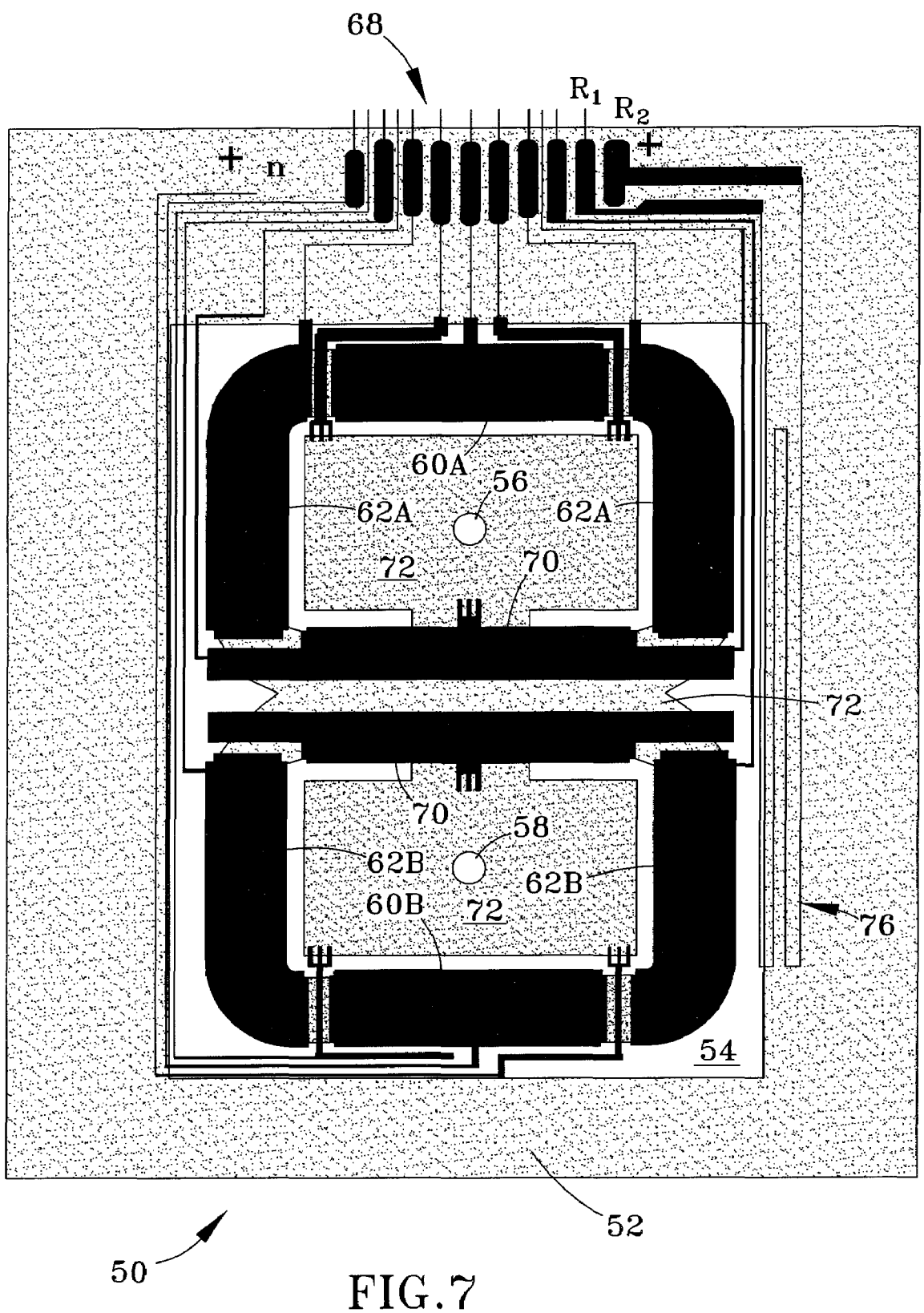
FIG. 7 is a plan view of a substrate configured for mounting the device of FIG. 5, and whose surface is equipped with drive, sense, and balance electrodes for causing, sensing, and controlling movement of the microtube.
Figure 8:
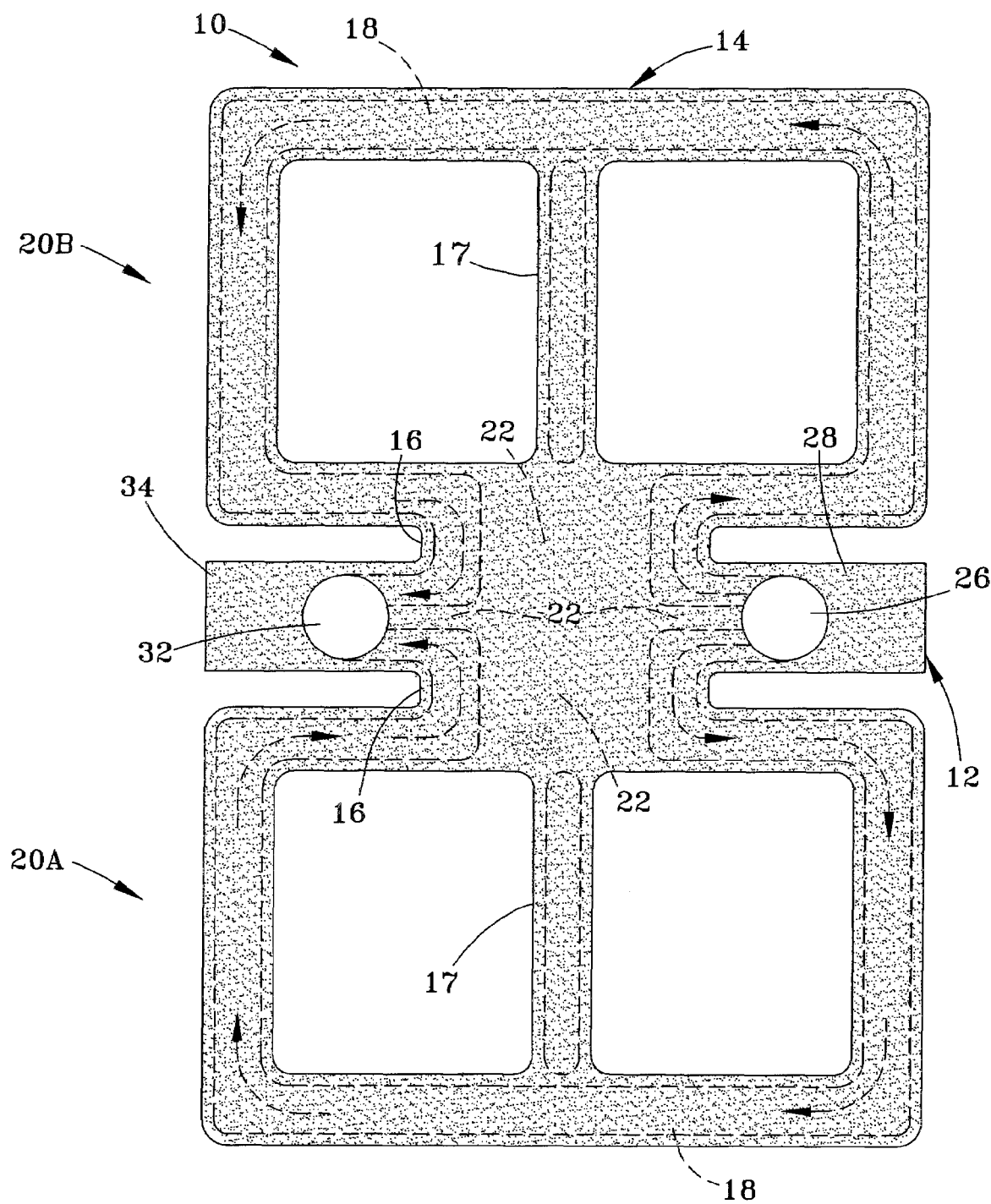
FIG. 8 is a plan view of a resonating microtube for a microfluidic device in accordance with a third embodiment of this invention.
Figure 10:
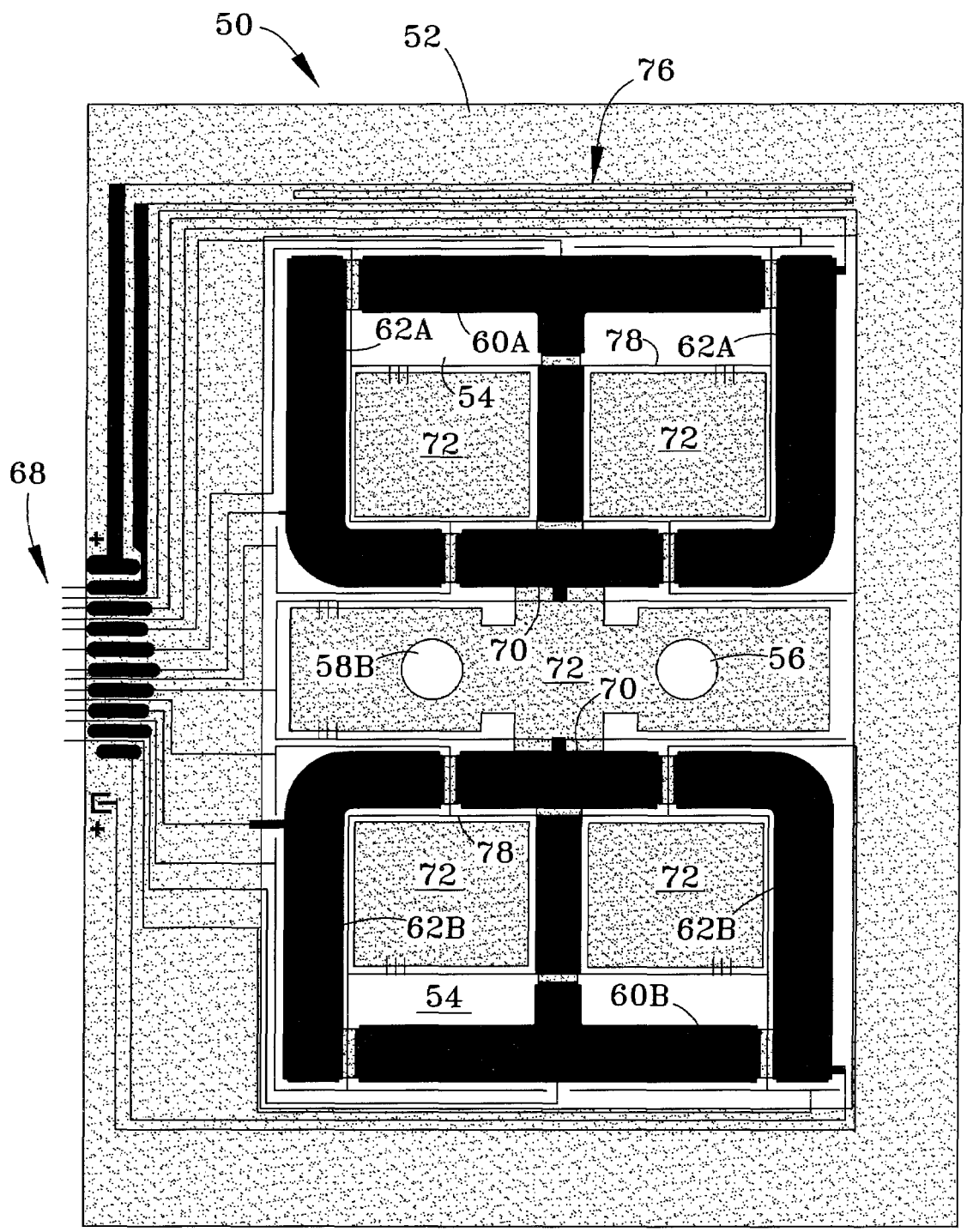
FIG. 10 is a plan view of a substrate configured for mounting the device of FIG. 8, and whose surface is equipped with drive, sense, and balance electrodes for causing, sensing, and controlling movement of the microtube.

FIGS. 1, 5 and 8 represent microtubes 10 for microfluidic devices according to three embodiments of the present invention, and FIGS. 4, 7 and 10 represent substrates 50, each having a surface 52 configured for mounting a corresponding one of the microtubes 10 thereto. In the Figures, consistent reference numbers are used to identify functionally equivalent structures.

The general construction and operation of microfluidic devices produced with the microtubes 10 and their substrates 50 are similar to the microfluidic devices of U.S. Pat. No. 6,477,901 to Tadigadapa et al. and U.S. Patent Application Publication Nos. 2007/0151335 and 2007/0157739 to Sparks et al., but with modifications to achieve enhanced or additional fabrication and operation characteristics and capabilities. In addition, fabrication processes for the microfluidic devices and their microtubes 10 and substrates 50 can generally be the same as those processes taught in Tadigadapa et al. and Sparks et al., as well as commonly-assigned U.S. Pat. No. 6,647,778 to Sparks and U.S. Pat. Nos. 7,351,603 and 7,381,628 to Sparks et al., whose contents regarding microtube fabrication processes are incorporated herein by reference. The microtubes 10 are preferably micromachined from silicon, doped silicon, or another semiconductor material, quartz, glass, ceramic, metal (for example, titanium and steel alloys), plastic, or composite material. As used herein, micromachining is a technique for forming very small elements by bulk etching a substrate (e.g., a silicon wafer), or by surface thin-film etching, the latter of which generally involves depositing a thin film (e.g., polysilicon or metal) on a sacrificial layer (e.g., oxide layer) on a substrate surface and then selectively removing portions of the sacrificial layer to free the deposited thin film. The microtubes 10 (which are termed "microtubes" to denote micromachined dimensions of preferably less than two millimeters) can either be fabricated entirely from layers of the chosen materials deposited on their substrates 50, or fabricated in part by etching the substrates 50. The substrates 50 can be formed of silicon or another semiconductor material, quartz, glass, ceramic, metal, or a composite material. The substrates 50 with their microtubes 10 attached thereto form what can be termed a microelectromechanical system (MEMS) chip. Appropriate packaging of the MEMS chip with associated control and signal conditioning circuitry yields a microfluidic device suitable for a wide variety of applications, including but not limited to fluid delivery, mixing, and sensing applications, for example, drug infusion systems, fuel cell systems, drug and chemical mixing systems, as well as numerous others.

With reference to FIGS. 1 and 4, the microtube 10 of FIG. 1 is configured to be supported above the surface 52 of the substrate 50 (FIG. 4) by a centrally-located base 12. The base 12 is represented as being generally X-shaped in plan view, which contributes additional strength to the physical connection between the microtube 10 and its substrate 50, though other shapes are foreseeable. The surface 52 is defined by a recess 54 in the substrate 50 underlying the entire microtube 10. In contrast to prior art microtubes having generally U-, C-, D-, or omega-shaped configurations, the microtube 10 of FIG. 1 has a generally axi-symmetrical shape relative to the base 12, with an outer ring-shaped peripheral region 14 supported from the base 12 by four radial arms 16.

The microtube 10 defines a continuous microchannel 18 through which a fluid can flow into the microtube 10 from the base 12, and is then returned to the base 12 as it exits the microtube 10. (The term "microchannel" is used to denote micromachined dimensions of preferably less than two millimeters.) The microchannel 18 is defined within the peripheral region 14 and each of its support arms 16, with four substantially identical portions of the microchannel 18 being located in what may be described as quadrant loops 20A, 20B, 20C, and 20D of the microtube 10. Portions of the microchannel 18 in each adjacent pair of loops 20A, 20B, 20C, and 20D is separated by a divider 22 within each arm 16 that creates two separate flow channels within each arm 16. Furthermore, the portion of the microchannel 18 in each loop 20A-D is fluidically connected to at least one other portion of the microchannel 18 via a flow-reversing channel 24 located within the base 12.

The flow route through the microtube 10 begins in the base 12 with an inlet port 26 located in a leg 28 of the base 12. The inlet port 26 is fluidically coupled to a passage 56 in the substrate 50 (FIG. 4). Flow then enters the microchannel 18 within the first loop 20A through an inlet channel 30 within the base leg 28, which diverts the flow to a radially-outward direction through the arm 16 shared by the first and fourth loops 20A and 20D, then in a generally circumferential direction through the portion of the microchannel 18 within the peripheral region 14 of the first loop 20A, and finally in a radially-inward direction through the arm 16 shared by the first and second loops 20A and 20B. Flow then enters the second loop 20B through the flow-reversing channel 24 connecting the portions of the microchannel 18 within the first and second loops 20A and 20B, and thereafter continues on in this manner through the microchannel 18 through the second, third and finally fourth loops 20B, 20C, and 20D of the microtube 10. The flow route through the microtube 10 ends within the base 12 at an outlet port 32 located in a second leg 34 of the base 12. Flow enters the outlet port 32 from the fourth loop 20D through an outlet channel 36 within the base leg 34. The outlet port 32 is fluidically coupled to a second passage 58 in the substrate 50 (FIG. 4). The inlet and outlet ports 26 and 32 of the microtube 10 and the inlet and outlet passages 56 and 58 of the substrate 50 are surrounded by the peripheral portion 14 of the microtube 10 and therefore located inside the perimeter of the microtubes 10, conserving space over prior art microfluidic devices whose inlet and outlet ports are located outside of the microtube loop.

The cross-section of the microtube 10 can be chosen to provide an adequate flow capacity for the fluid and to have suitable vibration parameters for the intended fluids to be evaluated with the microfluidic device. Because micromachining technologies are employed to fabricate the microtube 10, the size of the microtube 10 can be extremely small, such as cross-sectional areas of about 250 $\mu m^2$, with smaller and larger microtubes also being within the scope of this invention. The outer width of the microtube 10 (as measured across oppositely-disposed outer peripheral edges of the peripheral portion 14) can also be adapted for the particular fluid being evaluated and the particular properties being measured, with widths of up to about twenty millimeters being suitable for many applications. Fluid flow characteristics can be further modified by making the corners within the microchannels 18 sharper or smoother than that shown, with smoother corners being normally preferred to reduce trapped bubbles and bubble nucleation. Furthermore, flow rates through the microtube 10 can be increased by providing more inlet and outlet ports 26 and 32 to lower the pressured drop through the microchannel 18. For example, pairs of loops 20A-D could share a set of inlet and outlet ports 26 and 32, or each individual loop 20A-D could be equipped with its own inlet and outlet ports 26 and 32.

As taught in Tadigadapa et al., the microtube 10 of FIG. 1 can be vibrated at or near resonance to determine the mass flow rate and density of a fluid flowing through the microtube 10 using Coriolis force principles. Coriolis force principles can also be used to ascertain the volumetric flow rate, specific gravity, chemical concentration, viscosity, lubricity, and other properties of a fluid flowing through the microtube 10. As in Tadigadapa et al., with the central base 12 serving as a nonmoving anchor, the microtube 10 is vibrated, preferably at or near its resonant frequency, in a direction perpendicular to the surface 52 of the substrate 50. During half of the vibration cycle in a loop 20A-D of the microtube 10 moves upward, the loop 20A-D and the fluid therein has upward momentum, and the fluid as it flows out of the loop 20A-D resists having its vertical motion decreased by pushing up on the arm 16 of the microtube 10 through which the fluid exits the loop 20A-D. The resulting force causes the loop 20A-D to deflect, which, depending on the vibration mode as discussed in reference to FIGS. 2A, 2B, 3A, and 3B, may cause part of or the entire microtube 10 to deflect or twist. As the microtube 10 moves downward during the second half of its vibration cycle, deflection occurs in the opposite direction. This reaction is referred to as the Coriolis effect, and the degree to which the microtube 10 deflects during a vibration cycle as a result of the Coriolis effect can be correlated to the mass flow rate of the fluid flowing through the microtube 10, while the density of the fluid is proportional to the frequency of vibration at resonance. In addition to the density of the fluid within its microchannel 18, the resonant frequency of the microtube 10 is influenced by its mechanical design (shape, size, construction and materials). Resonant frequencies will generally be in the range of about 2 kHz to about 100 kHz for microtubes having the configuration represented in FIG. 1. The amplitude of vibration is preferably adjusted through means used to vibrate the microtube 10, discussed below in reference to the substrate 50.

Figure 2A:
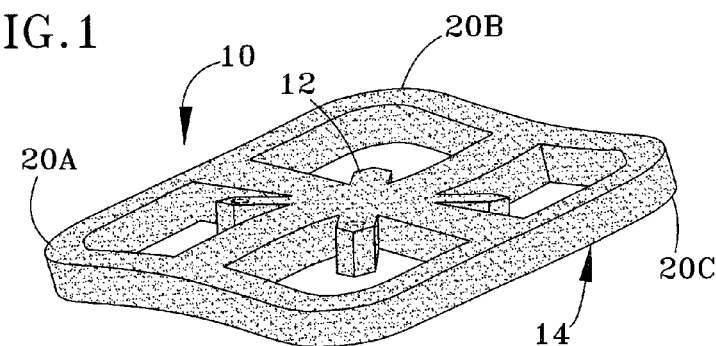
Figure 2B:
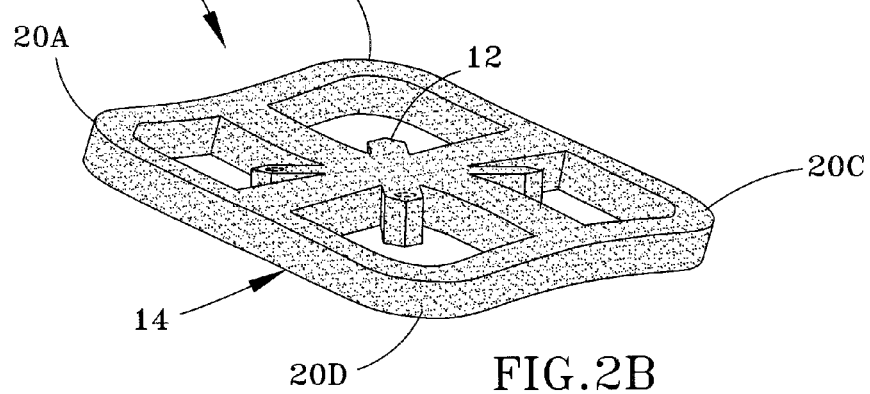

Because the microtube 10 of FIG. 1 does not have a simple U-, C-, D-, or omega-shaped configuration as in the case of the above-noted Tadigadapa et al., Sparks, and Sparks et al. patent documents, the microtube 10 is capable of vibration modes not possible with the prior art. FIGS. 2A, 2B, 3A, and 3B depict some of the potential resonant modes of the microtube 10. In FIGS. 2A and 2B, the microtube 10 is vibrated by suitable driving elements (see FIG. 4 and accompanying discussion below) so that two adjacent loops are deflected in the same direction and opposite the other two adjacent loops. In FIG. 2A, loops 20A and 20D are in-phase with each other and out-of-phase with loops 20B and 20C, whereas in FIG. 2B loops 20A and 20B are in-phase with each other and out-of-phase with loops 20C and 20D. By driving one side of the microtube 10 to produce the "tipping" mode of FIGS. 2A and 2B, the Coriolis effect produces motion in the opposite side of the microtube 10, thereby amplifying the sensor output signal by the Q of the resonator and greatly increasing the sensor output, by what can be called Q multiplication.

In FIG. 3A, the microtube 10 is represented as being driven so that all four loops 20A-D deflect upward and downward in unison, and FIG. 3B shows the microtube 10 as driven to vibrate so that pairs of opposite quadrants (e.g., 20A and 20C) deflect in the same direction, but opposite the deflection of the other pair of opposite quadrants (20B and 20D). These "twisting" modes of vibration do not achieve the Q multiplication effect noted above for FIGS. 2A and 2B, but could be used for another function such as frequency or gain monitoring or driving the microtube 10.

FIG. 4 represents the substrate 50 as having electrodes by which the desired vibration of the microtube 10 can be capacitively induced, controlled, and sensed. In the embodiment represented in FIG. 4, drive electrodes 60A-B are located on the surface 52 of the substrate 50 beneath the two peripheral portions 14 of the microtube 10 bridging the first and second loops 20A and 20B and the second and third loops 20B and 20C, respectively, and sense electrodes 62A-B are located on the surface 52 of the substrate 50 beneath the two peripheral portions 14 of the microtube 10 bridging the third and fourth loops 20C and 20DB and the fourth and first loops 20D and 20A, respectively. FIG. 4 also represents the substrate 50 as being equipped with additional electrodes 64A-B and 66A-B that are located between the drive and sense electrodes 60A-B and 62A-B and, in a preferred embodiment, serve as balance electrodes. If formed of an electrically-conductive material, such as doped silicon, the microtube 10 can serve as an electrode that can be capacitively coupled to the drive electrodes 60A-B and sense electrodes 62A-B, enabling the electrodes 60A-B to electrostatically drive the microtube 10 and the electrodes 62A-B to electrostatically sense the microtube 10. However, it is foreseeable that the microtube 10 could be formed of a nonconductive material, and separate electrodes formed on the microtube 10 facing the electrodes 60A-B and 62A-B for electrostatically vibrating and sensing the microtube 10. The capacitive gap between the microtube 10 and its electrodes 60A-B, 62A-B, 64A-B, and 66A-B can be established by appropriately micromachining the lower surface of the microtube 10 and/or the surface of the substrate 50. Smaller capacitive gaps correspond to higher capacitive outputs and lower balance voltages required. High impedance buffer/amplifiers for a capacitive operating scheme can be built into the substrate 50 or located on an adjacent chip or board component.

Alternative driving techniques are also possible for the microtube 10, including the use of a piezoelectric element on the upper surface of the microtube 10 to generate alternating forces in the plane of the microtube 10 that flex the microtube 10 in directions normal to the plane of the microtube 10. Still other alternatives are to drive the microtube 10 magnetically, thermally, piezoresistively, thermally, optically, or by another actuation technique.

The sense electrodes 62A-B sense the deflection of their adjacent peripheral portions 14 of the microtube 10 relative to the substrate 50, as well as provide feedback to the drive electrodes 60A-B to enable the vibration frequency to be controlled with any suitable on-chip or remote microprocessor or microcontroller (not shown). The sense electrodes 62A-B can sense the proximity or motion of the microtube 10 capacitively, electrostatically, magnetically, piezoelectrically, piezoresistively, thermally, optically, or in any other suitable manner capable of sensing the proximity or motion of the microtube 10. Furthermore, the degree to which the microtube 10 deflects or twists during a vibration cycle as a result of the Coriolis effect can be detected by the sense electrodes 62A-B on the basis of the amplitude of the deflection and/or the phase difference between the different regions of the peripheral portion 14 of the microtube 10 sensed by the electrodes 62A-B.

The microtube 10 can be used in either open- or closed-loop mode. Open-loop operation will tend to be nonlinear and so is not the preferred method. With the sense and balance electrodes 62A-B, 64A-B, and 66A-B, motion of the microtube 10 can be controlled in a manner somewhat similar to a ring gyroscopes. In the embodiment of FIGS. 1-4, amplitude, not phase, is used to sense mass flow via the Coriolis effect. The drive electrode 60A is used to drive the fundamental resonant mode of vibration using a DC bias and AC signal, and the drive electrode 60B is used as the closed-loop feedback. The AC amplitude of this loop is the flow rate through the microtube 10. The drive electrode 60B nulls the sense electrode 62B in the ninety-degree loop where the flow rate is sensed.

The electrodes 64A-B and 66A-B can be used as balancing electrodes to compensate for errors leading to output errors and drift due to processing differences across the microtube 10, packaging-related stresses, and aging effects. For example, the electrodes 64A-B can be used for course balance, while the electrodes 66A-B can be used in a balance loop. Course balance with the electrodes 64A-B can be set during sensor chip calibration. Quadrature control can be used for the balance loop of the electrodes 66A-B, providing a third control loop of this sensing system. The balance voltages are adjusted to null-out the zero degree quadrature error. The sense electrode 62B can also used for the balance quadrature signal at zero degrees. The surface areas of the balance electrodes 64A-B and 66A-B represented in FIG. 4 can be varied to improve balance capability. The bias on the microtube 10 can also be varied, for example, increased to enable the balancing of a higher percentage of fabricated microtubes 10.

A positive bias can be applied to the electrodes 64A and/or 66A and/or a negative bias can be applied to the electrodes 64B and/or 66B to compensate for a twist that is present in the microtube 10 as a result of manufacturing or material variations that can cause a zero-flow offset error in the sensor output. A balance control loop can be incorporated into the microprocessor/microcontroller associated with the device, by which the outputs of the sense electrodes 62A-B are used to vary the balance voltage over temperature and time to compensate for this offset difference between the loops 20A-D of the microtube 10. This compensation can greatly improve the basic noise floor of the microfluidic device, enhancing output resolution and accuracy. Offset compensation can be accomplished with a two-step process. During sensor calibration, any offset error or difference can be nulled out by adjusting the bias of the balance electrodes 64A-B and 66A-B to provide rough balancing or compensation. The balance control loop can then be employed to perform any further adjustments to the bias of the balance electrodes 64A-B and 66A-B to complete the compensation process, and allow for corrections to be made during the operation of the microfluidic device.

The electrodes 64A-B and 66A-B can also be employed to compensate for damping due to a two-phase condition, such as where bubbles, solid particles, an emulsion phase, etc., is present in the fluid being evaluated. When a reduced gain or Q factor condition is detected, the microprocessor/microcontroller associated with the device can operate the electrodes 64A-B and 66A-B as additional drive electrodes to increase the amplitude of the microtube 10, with the intent of dislodging and expelling the bubbles, solid particles, emulsion phase, or other second phase that caused the increased damping condition. In addition, the second set of electrodes 64A-B and 66A-B can be employed as drive electrodes along with or instead of the drive electrode 60A-B, or used as sense electrodes to supplement the sense electrodes 62A-B. If the electrodes 64A-B and 66A-B are used for sensing, any set of the sense electrodes 62A-B and 64A-B and 66A-B can operate on the basis of phase difference and/or amplitude measurement. For example, depending on the vibration mode of the microtube 10 (e.g., FIGS. 2A, 2B, 3A, or 3B), the amplitude measurement approach could be used by those electrodes where the Coriolis flow effect is most pronounced, while the phase difference approach can be used by the remaining electrodes located elsewhere.

Input and output signals to the electrodes 60A-B, 62A-B, 64A-B, and 66A-B are made through bond pads 68 along an edge of the substrate 50, and are transmitted to the microprocessor/microcontroller, preferably with appropriate signal conditioning circuitry (not shown). Ground contacts 70 are shown as being formed in the same metal layer as that used to form the electrodes 60A-B, 62A-B, 64A-B, and 66A-B and bond pads 68, and by which an electrical ground to the tube base 12 is provided to enable the microtube 10 or an electrode formed on the microtube 10 to be capacitively coupled to the drive electrodes 60A-B. FIG. 4 represents the substrate 50 as having doped regions 72 that tie the ground contacts 70 together, as well as allow for a dual-level metal capability that includes resistive crossovers 74 for wiring between the electrodes 60A-B, 62A-B, 64A-B, and 66A-B and their bond pads 68.

For monitoring temperature, the substrate 50 is represented as equipped with a temperature sensing element 76. A suitable construction for the sensing element 76 can make use of one or more metal layers of the type employed to form the electrodes 60A-B, 62A-B, 64A-B, and 66A-B and their associated conductive runners. For example, a resistive-based temperature sensing element 76 can be formed by a thin-film metal layer of platinum, palladium, nickel, or another metal or alloy, in accordance with known practices. With the temperature sensing element 76, changes in mechanical properties of the microtube 10 and properties of the fluid therein attributable to temperature changes can be compensated for with signal conditioning circuitry.

Similar to the microfluidic devices of the above-noted Tadigadapa et al., Sparks, and Sparks et al. patent documents, the MEMS chip produced with the microtube 10 and its substrate 50 can be enclosed by a capping wafer (not shown) to form a microfluidic device package. The use of a capping wafer allows for vacuum packaging that reduces air damping of the tube vibration. A variety of package and wafer-level methods exist to vacuum-package devices. These include solder or weld hermetic packages, and wafer bonding using glass frit, solder, eutectic alloy, adhesive, and anodic bonding. A typical material for the capping wafer is silicon, allowing silicon-to-silicon bonding techniques to be used, though it is foreseeable that a variety of other materials could be used, including metals and glass materials, the latter including borosilicate glass (e.g., Pyrex). Furthermore, in view of the capability of the microtube 10 to transfer lower levels of acoustic energy to the MEMS package, plastics becomes another potential packaging material for the invention. Control circuitry for the microfluidic device, such as signal conditioning circuitry and a microprocessor or microcontroller can be placed on the capping wafer. For example, such circuitry can be in the form of an ASIC (application-specific integrated circuit) placed on the capping wafer, or the capping wafer can be an integrated circuit wafer on which the circuitry can be fabricated.

In the preferred embodiment of the invention in which the bond between the capping wafer and substrate 50 is hermetic, the resulting enclosure is evacuated to enable the microtube 10 to be driven efficiently at high quality (Q) factor values without damping. In such an embodiment, a getter material is preferably placed in the enclosure to assist in reducing and maintaining a low cavity pressure. As an alternative to a hermetically-sealed package, the microtube 10 could be enclosed such that a vacuum can be drawn when desired through the use of a pump.

FIGS. 5 through 10 represent the second and third embodiments of the microtube 10 and their corresponding substrates 50 (again, consistent reference numbers are used to identify functionally equivalent structures). The general construction and operation of microfluidic devices constructed of these microtubes 10 and their substrates 50 are similar to that for the embodiment of FIGS. 1-4. As such, the following discussion will be limited to discussing aspects and features shown in FIGS. 5 through 10 that differ from the embodiment of FIGS. 1 through 4.

Whereas the embodiment of FIGS. 1 through 4 utilizes a microchannel 18 with four flow loops in series, the two embodiments of FIGS. 5 through 10 employ a double flow loops in parallel, in which the flow through the microchannel 18 is split at the inlet port 26 to flow through loops 20A and 20B and then rejoined at the outlet loop 32, the effect of which is to reduce the pressure drop through the microchannel 18 by approximately half. Similar to the embodiment of FIGS. 1 through 4, the double-loop microtubes 10 shown in FIGS. 5 and 8 also have the advantage of efficient use of chip space, enabling a smaller overall MEMS chip size.

In FIG. 5, the base 12 straddles the two loops 20A and 20B, with the leg 28 of the base 12 containing the inlet port 26 surrounded by the loop 20A and the leg 34 of the base 12 containing the outlet port 32 surrounded by the loop 20B. The microtube 10 of FIG. 5 has a generally symmetrical shape relative to an axis transverse to the legs 28 and 34 of the base 12. In FIG. 8, the base 12 is between the loops 20A and 20B, such that both ports 26 and 32 and legs 28 and 34 are also between the loops 20A and 20B. The microtube 10 of FIG. 8 also has a generally symmetrical shape, though the axis of symmetry being parallel to the legs 28 and 34 of the base 12.

Other notable structural differences between the embodiments of FIGS. 5 and 8 and that of FIG. 1 are the locations of the arms 16 and the flow dividers 22. FIG. 5 utilizes flow dividers 22 within the arms 16, as well as an additional divider 22 within the base 12 to separate the inlet and outlet ports 26 and 32. FIG. 8 utilizes flow dividers 22 within the base 12 to initially divide the inlet flow from the inlet port 26 and direct the divided inlet flow to both loops 20A and 20B, separate the flow returning from the loops 20A and 20B prior to entering the outlet port 28, and separate the inlet and outlet flows within the base 12. In FIG. 8, the support arms 16 between the base 12 and the loops 20A and 20B can be much shorter than in the other embodiments, and extensions 17 of the arms 16 provide additional structural support to the peripheral portion 14 of the microtube 10 within each loop 20A and 20B. Fluid flow occurs in the arms 16, but not the extensions 17. Resonant frequencies will generally be in the range of about 2 kHz to about 100 kHz for microtubes having the configurations represented in FIGS. 5 and 8.

Figure 6A:
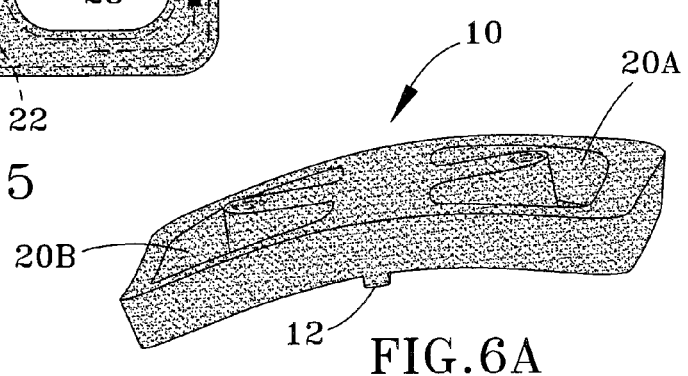
FIGS. 6A, 6B, and 6C depict three different vibrational operating modes for the microtube of FIG. 5.
Figure 6B:
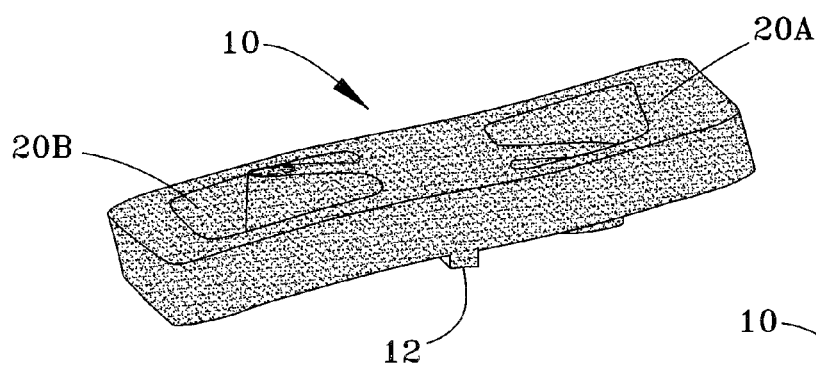
Figure 6C:
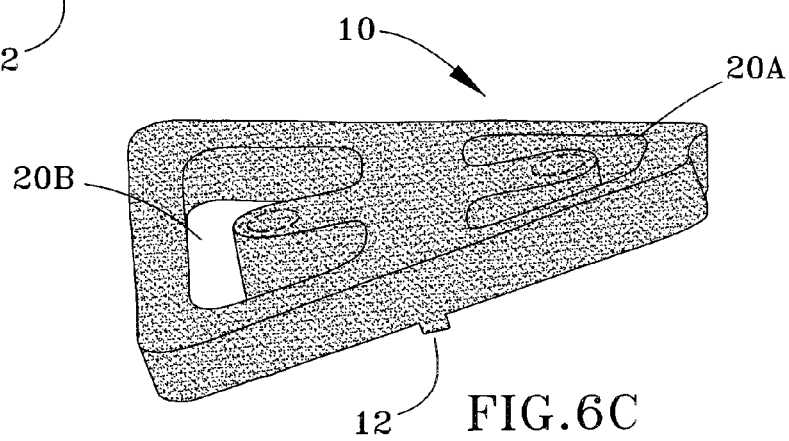
Figure 9A:
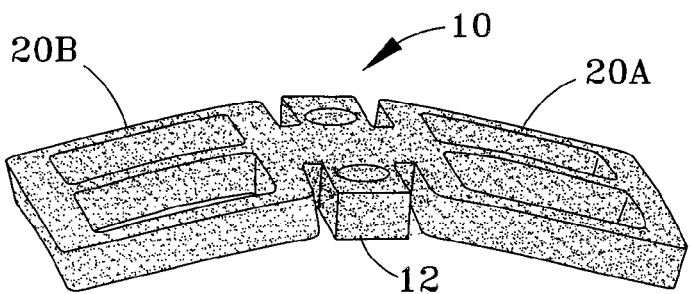
FIGS. 9A, 9B, 9C, and 9D depict four different vibrational operating modes for the microtube of FIG. 8.
Figure 9B:
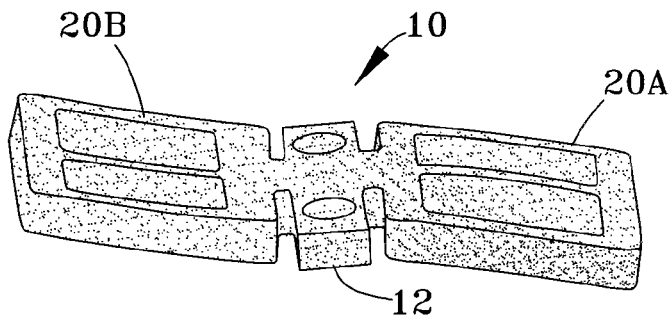
Figure 9C:
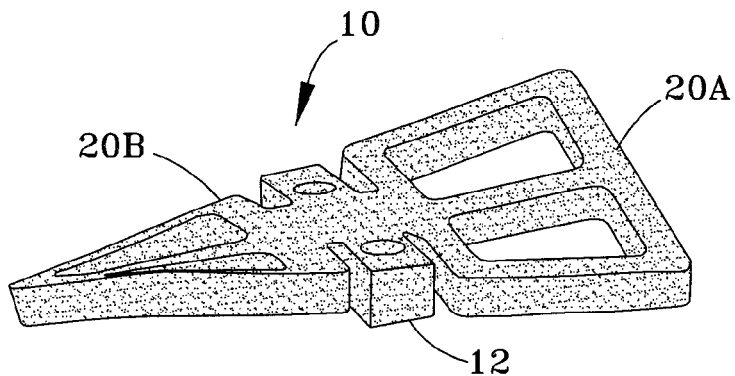
Figure 9D:
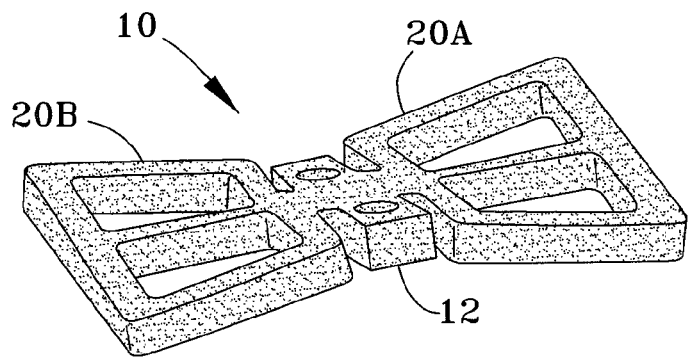

FIGS. 6A-C and 9A-D depict some of the potential resonant modes of the microtubes 10 of FIGS. 5 and 8, respectively, that can be induced with appropriate driving elements, such as those shown in FIGS. 7 and 10 and discussed below. In FIGS. 6A and 9A, the microtubes 10 are represented as being driven so that both loops 20A and 20B deflect upward and downward in unison, similar to what is shown in FIG. 3A for the first embodiment of the microtube 10. In FIGS. 6B and 9B, the microtubes 10 are vibrated to achieve the "tipping" mode in which the loops 20A and 20B deflect in opposite directions. In FIGS. 6C and 9C, the loops 20A and 20B are driven to induce a "twisting" in which diagonally-opposite corners of the loops 20A and 20B are in-phase with each other and out-of-phase with the other diagonally-opposite corners of the loops 20B and 20C, similar to what is shown in FIG. 3B for the first embodiment of the microtube 10. Finally, FIG. 9D represents another vibration mode in which the corners of each individual loop 20A and 20B are in phase with each other, but diagonally-opposite corners of the loops 20A and 20B are out-of-phase with each other.

By driving the microtubes 10 in the twisting modes of FIGS. 6C and 9C, very little acoustic energy is lost by transmission to the substrate 50 and its package. With prior art resonating sensors, the Q and gain of the resonator generally decreases if low density or low speed-of-sound materials such as plastic were to be employed as the substrate material. As a result, high-density, high-mass materials such as stainless steel and glass have often been used for MEMS chips. Using the twisting drive mode if FIGS. 6C and 9C reduces the amount of acoustic energy transferred from the resonating microtube 10 and substrate 50 to the MEMS package, lowering clamping losses and allowing for the use of materials with lesser properties to those typically used for micromachine packaging in the past. For example, it is foreseeable that plastic materials could be used instead of silicon, glass, or metals.

FIGS. 7 and 10 depict the locations of the drive and sense electrodes 60A-B and 62A-B, respectively. Balance electrodes (such as 64A-B and 66A-B in FIG. 4) could be used but are not shown. As with the previous embodiments, the electrodes 60A-B and 62A-B are adapted to drive and sense the microtube 10 electrostatically and capacitively, respectively, though other driving and sensing means could be employed, as discussed in reference to FIG. 4. FIG. 10 shows the inclusion of addition metal runners that define rings 78 that substantially surround the drive and sense electrodes 60A-B and 62A-B. The rings 78 can be tied to a Vref line of an output amplifier of the microfluidic device to reduce noise of the device output.

While the invention has been described in terms of certain embodiments, it is apparent that other forms could be adopted by one skilled in the art. Therefore, the scope of the invention is to be limited only by the following claims.

The invention claimed is:

1. A microfluidic device for determining at least one property of a fluid, the device comprising:
    a substrate;
    a structure comprising a base supported by the substrate and a microtube supported by the base so as to be spaced apart from a surface of the substrate and capable of vibrating in a plane normal to the surface of the substrate, the microtube comprising a peripheral portion surrounding the base, arms supporting the peripheral portion from the base, and at least one continuous internal microchannel having at least first and second microchannel portions, each of the first and second microchannel portions defining a separate flow route, each of the flow routes originating at the base, continuing through a portion of the peripheral portion of the microtube, and returning to the base, the first microchannel portion being fluidically connected to an inlet port within the base and the second microchannel portion being fluidically connected to an outlet port within the base;

driving means for vibrating the microtube; and sensing means for sensing deflections of the peripheral portion of the microtube when vibrated with the driving means, and adapted for producing outputs corresponding to the sensed deflections;

wherein the microfluidic device determines the property of the fluid from the outputs of the sensing means as the fluid flows through the microchannel.

2. The microfluidic device according to claim 1, wherein the flow routes of the first and second microchannel portions are in series within the microtube.

3. The microfluidic device according to claim 2, wherein the microchannel has third and fourth microchannel portions in addition to the first and second microchannel portions, each of the first, second, third, and fourth microchannel portions defines a separate flow route, and the flow routes of the first, second, third, and fourth microchannel portions are in series within the microtube.

4. The microfluidic device according to claim 3, wherein the first, second, third, and fourth microchannel portions are within the peripheral portion and the arms of the microtube, and the peripheral portion and the arms define four fluidically-interconnected microtube loops that are axi-symmetrically spaced around the base.

5. The microfluidic device according to claim 4, further comprising dividers within the arms to fluidically separate the first, second, third, and fourth microchannel portions within the arms.

6. The microfluidic device according to claim 5, further comprising means within the base for reversing the direction of flow leaving each of the arms prior to re-entering the same arm as the fluid flows in series through the first, second, third, and fourth microchannel portions.

7. The microfluidic device according to claim 4, wherein the fluid enters the microtube via a first of the microtube loops and exits the microtube via a fourth of the microtube loops immediately adjacent the first microtube loop.

8. The microfluidic device according to claim 4, wherein the base comprises four legs and each of the legs extends into one of the four microtube loops.

9. The microfluidic device according to claim 4, wherein the microtube is vibrating such that a diagonally-opposite pair of the microtube loops are deflecting out-of-phase with each other, and the fluid flowing through the microchannel causes the Coriolis effect to induce motion in the microtube that is amplified by the Q of the microtube to increase the outputs of the sensing means.

10. The microfluidic device according to claim 1, wherein the flow routes of the first and second microchannel portions are parallel flow routes within the microtube.

11. The microfluidic device according to claim 10, wherein the microchannel does not comprise microchannel portions in addition to the first and second microchannel portions.

12. The microfluidic device according to claim 10, wherein the first and second microchannel portions are within the peripheral portion and the arms of the microtube, and the peripheral portion and the arms define two fluidically-interconnected microtube loops symmetric about the base.

13. The microfluidic device according to claim 12, wherein the base comprises first and second legs containing the inlet and outlet ports, respectively, each of the first and second legs extends into a corresponding one of the two microtube loops, and the microtube loops are symmetric about an axis of symmetry that is transverse to the legs of the base.

14. The microfluidic device according to claim 13, further comprising dividers within the arms of the microtube to fluidically separate the first and second microchannel portions within the arms.

15. The microfluidic device according to claim 13, wherein the arms of the microtube extend along the axis of symmetry.

16. The microfluidic device according to claim 13, wherein each of the microtube loops defines first and second corners, the microtube is vibrating such that a first diagonally-opposite pair of the corners is deflecting in-phase with each other, a second diagonally-opposite pair of the corners is deflecting in-phase with each other, and the first and second diagonally-opposite pairs are deflecting out-of-phase with each other, such that acoustic energy transferred from the microtube to the substrate is reduced.

17. The microfluidic device according to claim 12, wherein the base comprises first and second legs containing the inlet and outlet ports, respectively, each of the first and second legs extends between the two microtube loops, and the microtube loops are symmetric about an axis of symmetry through the legs of the base.

18. The microfluidic device according to claim 17, further comprising dividers within the arms of the microtube to fluidically separate the first and second microchannel portions within the arms.

19. The microfluidic device according to claim 17, wherein the arms of the microtube extend transverse to the axis of symmetry.

20. The microfluidic device according to claim 17, wherein each of the microtube loops defines first and second corners, the microtube is vibrating such that a first diagonally-opposite pair of the corners is deflecting in-phase with each other, a second diagonally-opposite pair of the corners is deflecting in-phase with each other, and the first and second diagonally-opposite pairs are deflecting out-of-phase with each other, such that acoustic energy transferred from the microtube to the substrate is reduced.

21. The microfluidic device according to claim 1, further comprising additional means for balancing the vibration of the microtube in cooperation with the driving and sensing means.

22. The microfluidic device according to claim 1, wherein the microfluidic device is installed in a system chosen from the group consisting of chemical concentration sensors, fuel cell systems, and drug delivery systems.

23. The microfluidic device according to claim 1, wherein the driving means comprises at least one means for driving the microtube electrostatically, magnetically, or piezoelectrically.

24. The microfluidic device according to claim 1, wherein the driving means comprises at least one drive electrode on the surface of the substrate and adjacent the peripheral portion of the microtube.

25. The microfluidic device according to claim 1, wherein the sensing means comprises at least one means for sensing the microtube capacitively, magnetically, or piezoelectrically.

26. The microfluidic device according to claim 1, wherein the sensing means comprises at least one sense electrode on the surface of the substrate and adjacent the peripheral portion of the microtube.

27. The microfluidic device according to claim 1, wherein the microtube is a micromachine formed of a material chosen from the group consisting of silicon, doped silicon and other semiconductor materials, quartz, glass materials, ceramic materials, titanium, steel and other metallic materials, plastic materials, and composite materials.

28. A method comprising using the microfluidic device of claim 1 to measure the at least one property of the fluid, the at least one property being chosen from the group consisting of mass flow rate, density, volumetric flow rate, specific gravity, and chemical concentration of the fluid.

* * * * *